United States Patent [19]
Kawanabe

[11] Patent Number: 5,924,059
[45] Date of Patent: Jul. 13, 1999

[54] DOCUMENT PROCESSING METHOD AND APPARATUS FOR DISCRIMINATING WHETHER A DICTIONARY MEMORY IS PRESENT

[75] Inventor: Tetsuya Kawanabe, Yokohama, Japan

[73] Assignee: Canon Kabushiki Kaisha, Tokyo, Japan

[21] Appl. No.: 08/197,536

[22] Filed: Feb. 17, 1994

Related U.S. Application Data

[63] Continuation of application No. 07/703,863, May 21, 1991, abandoned.

[30] Foreign Application Priority Data

May 13, 1990 [JP] Japan ................................. 2-131329

[51] Int. Cl.⁶ ........................................................ G06F 17/21
[52] U.S. Cl. ................................................ 704/10; 707/533
[58] Field of Search ..................... 364/419.16, 419.11, 364/419.12; 235/492, 441, 476; 395/760, 758, 794, 795; 704/10, 9, 8, 4, 5, 2

[56] References Cited

U.S. PATENT DOCUMENTS

| | | |
|---|---|---|
| 4,383,306 | 5/1983 | Morimoto et al. . |
| 4,556,954 | 12/1985 | Advani et al. . |
| 4,644,492 | 2/1987 | Murata . |
| 4,671,684 | 6/1987 | Kojima et al. . |
| 4,742,481 | 5/1988 | Yoshimura . |
| 4,758,955 | 7/1988 | Chen . |
| 4,829,472 | 5/1989 | McCourt et al. . |

FOREIGN PATENT DOCUMENTS

| | | |
|---|---|---|
| 0251477 | 1/1988 | European Pat. Off. . |
| 58-205255 | 11/1983 | Japan . |
| 62-239266 | 10/1987 | Japan . |
| 2220773 | 1/1990 | United Kingdom . |

OTHER PUBLICATIONS

IBM Technical Disclosure Bulletin, vol. 25, No. 4, pp. 2163–2164, "Spelling Check For Selected Pages" by Levine.

Sigplan Notices, vol. 16, No. 6, pp. 51–60, "Checking for Spelling and Typographical Errors in Computer–Based Text" by Turba.

Patent Abstracts of Japan, vol. 12, No. 415 (P-781) published Nov. 4, 1988, English Abstract of Japanese Patent No. 63-153690.

*Primary Examiner*—Robert A. Weinhardt
*Attorney, Agent, or Firm*—Fitzpatrick, Cella, Harper & Scinto

[57] ABSTRACT

A document processing apparatus having a spell checker function for detecting a misspelling of an input word, and informing the operator of the detected misspelling, includes the presence control unit for detecting a dictionary memory used in detection of the misspelling of the word, and enabling/disabling the spell checker function in accordance with the detection result.

15 Claims, 7 Drawing Sheets

DOCUMENT PROCESSING METHOD AND APPARATUS FOR DISCRIMINATING WHETHER A DICTIONARY MEMORY IS PRESENT

This application is a continuation of application Ser. No. 07/703,863, filed May 21, 1991, now abandoned.

BACKGROUND OF THE INVENTION

1. Field of the Invention

The present invention relates to a document processing apparatus such as an electronic typewriter, a wordprocessor, and the like and, more particularly, to a document processing method and apparatus having a spell checker function.

2. Related Background Art

In recent years, many document processing apparatuses have been provided with a spell checker function for detecting misspellings of input words, and so informing an operator. In particular, many European language document processing apparatuses adopt an English spell checker function.

The European language document processing apparatuses are presented to countries in other language zones such as a French-speaking zone, a German-speaking zone, and the like as well as countries in English-speaking zones. In this case, apparatuses in which the English spell checker function is enabled are presented to the English-speaking zone, and apparatuses in which the English spell checker function is disabled are usually presented to countries other than in an English-speaking zone. In this case, in an arrangement of a conventional document processing apparatus, the spell checker function is enabled/disabled depending on a difference in control software, or by selecting the connection of a specification setup switch or jumper wire.

However, in the arrangement for enabling/disabling the spell checker function depending on a difference in software, different software programs must be prepared in units of shipping counties. More specifically, combinations of parts such as ROMs (read-only memories) storing the software programs are different in correspondence with shipping countries, and assembling and inspection processes in the manufacture of the apparatuses must be performed in units of shipping countries, resulting in an increase in the manufacturing cost.

With the arrangement using the specification setup switch or jumper wire, the above-mentioned switch or the like is required, and the setup operation for the switch or the like is required, resulting in a high cost.

SUMMARY OF THE INVENTION

It is an object of the present invention to provide a document processing method and apparatus having a spell checker function, which can automatically enable/disable the spell checker function with an inexpensive arrangement.

It is another object of the present invention to provide a document processing method and apparatus, which comprises control means for detecting the presence/absence of a dictionary memory used for checking word spelling, and for enabling or disabling the spell checker function on the basis of the detection result.

It is still another object of the present invention to provide a document processing method and apparatus, which can automatically enable/disable a spell checker function in accordance with the presence/absence of a dictionary memory.

DETAILED DESCRIPTION OF THE PREFERRED EMBODIMENTS

An embodiment of the present invention will be described in detail below with reference to the accompanying drawings. This embodiment exemplifies a European language electronic typewriter which can enable/disable an English spell checker function. Note that the present invention may be implemented by a single apparatus or may be attained by a system consisting of a plurality of devices. As a matter of course, the present invention may be attained by supplying a program to the apparatus or system.

First Embodiment

FIGS. 1 to 6 are views for explaining an electronic typewriter according to the first embodiment of the present invention.

Figure 2:
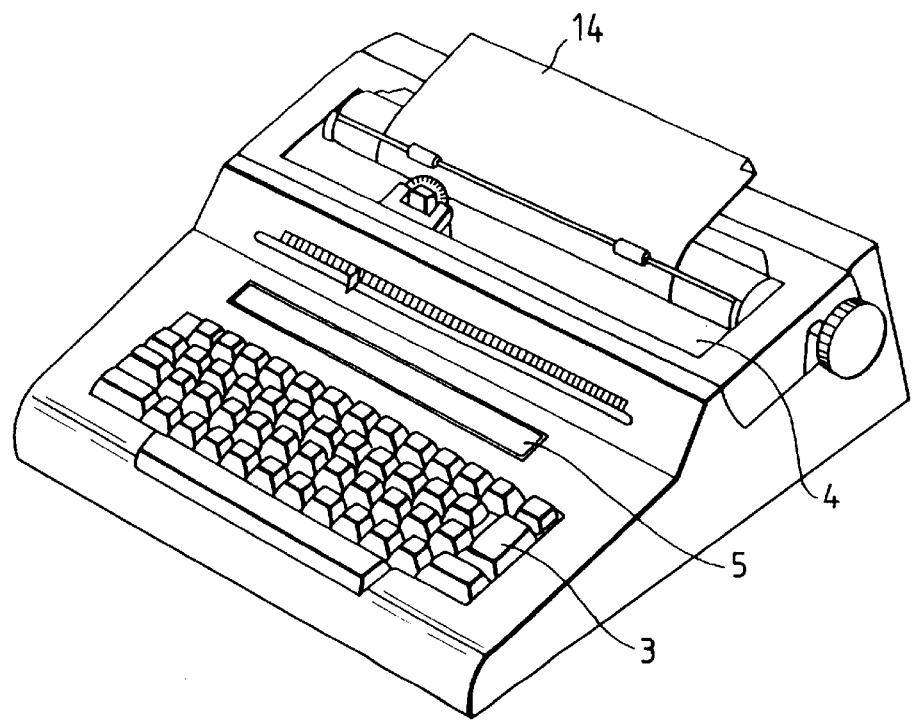
FIG. 2 is a perspective view showing the outer appearance of the typewriter shown in FIG. 1.

FIG. 2 shows the outer appearance of the electronic typewriter. A keyboard 3, as an operation input means, and a display 5, comprising an LCD (liquid crystal display) for performing various displays, are arranged on the upper surface of the typewriter main body. An operator can operate the keyboard 3 to input character data, thereby creating a document on the display 5. The created document can be printed out on a printing paper sheet 14 by a printer 4. The printer 4 comprises, e.g., a daisy-wheel printer for printing data using a daisy wheel.

Figure 1:
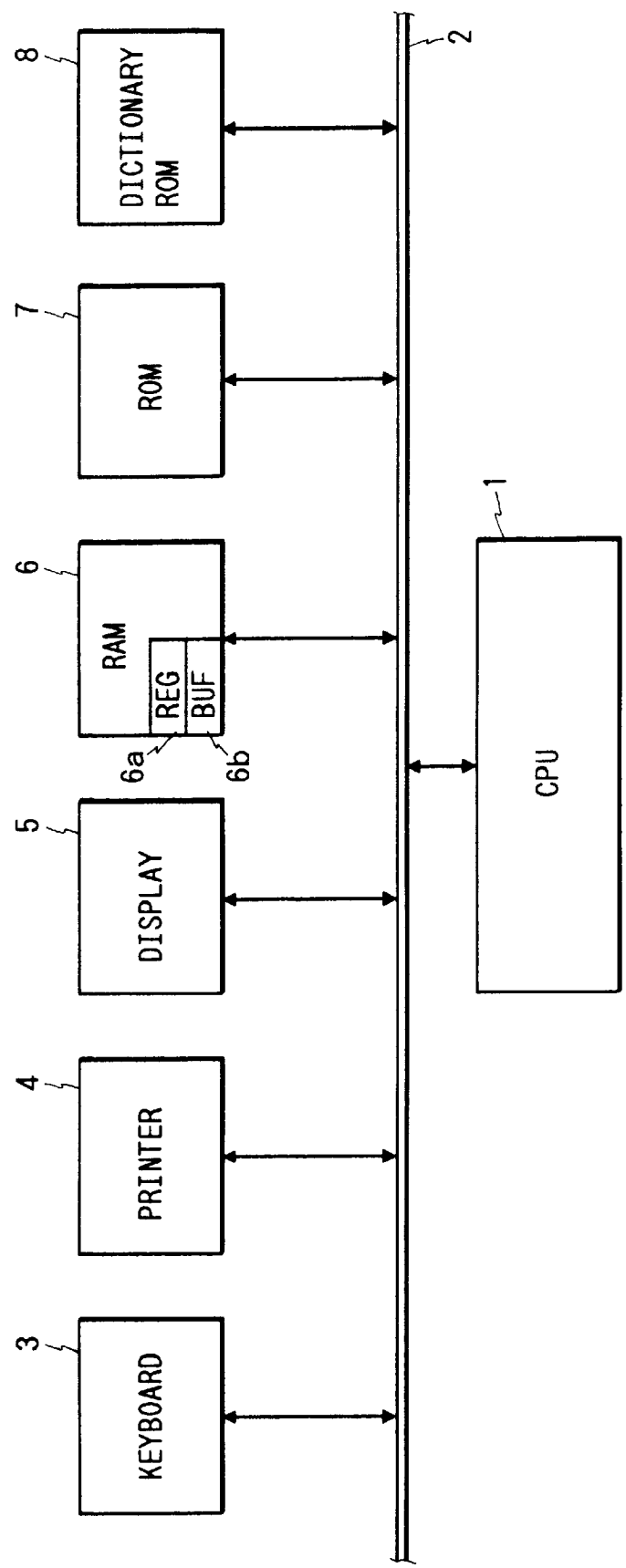
FIG. 1 is a block diagram showing an arrangement of a control system of an electronic typewriter.

The arrangement of a control system of the electronic typewriter will be described below with reference to FIG. 1. In FIG. 1, a CPU (central processing unit) 1 comprises a microprocessor element for controlling the entire electronic typewriter. The CPU 1 is connected to the keyboard 3, the printer 4, the display 5, a RAM (random-access memory) 6, a ROM (read-only memory) 7, and a dictionary ROM 8 via a bus 2.

The RAM 6 is used as a working area for the CPU 1, a buffer for storing printing data, and the like, and a portion of the RAM 6 is used as a register 6a for storing enable/disable setup data of a spell checker function as data indicating a detection result of the presence/absence in the dictionary ROM 8 (to be described later), and a register 6b for storing word data to be spell-checked. Note that the buffer 6b is used for storing target data "this" in presence/absence detection processing shown in FIG. 5 (to be described later).

Figure 3:
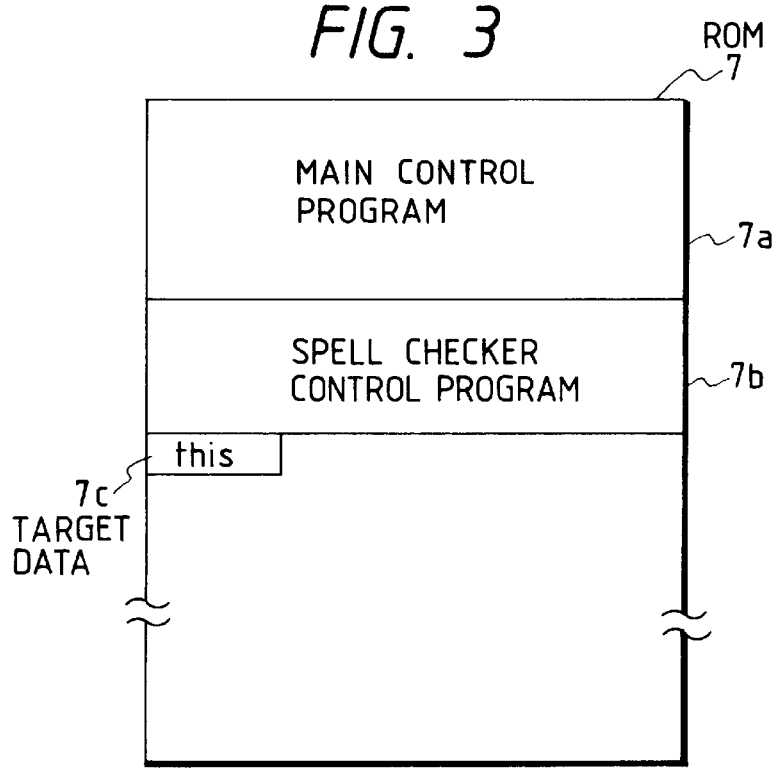
FIG. 3 is an explanatory view of the storage content of a ROM 7 shown in FIG. 1.

The content of the ROM 7 is as shown in FIG. 3. The ROM 7 stores a main control program 7a corresponding to a control sequence of the main routine shown in FIG. 4, a spell checker control program 7b corresponding to a control sequence of the presence/absence detection processing shown in FIG. 5 and spell checker processing shown in FIG. 6, and target data 7c. For example, an English word "this" is used as the target data 7c so as to detect the presence/absence in the English dictionary ROM 8.

The dictionary ROM 8 stores English dictionary data, i.e., dictionary data for detecting misspellings (errors) of English words. When the typewriter of this embodiment is delivered to the countries in the English-speaking zone, the dictionary ROM 8 is arranged; when the typewriter of this embodiment is delivered to countries in the non-English-speaking zone, no dictionary ROM 8 is arranged. Note that the dictionary data are so-called hash-coded data.

With this arrangement, the CPU 1 reads out and executes the control programs 7a and 7b stored in the ROM 7 in accordance with a reset signal upon power-on of the typewriter, and analyzes input data if an operator inputs data using the keyboard 3. The CPU 1 causes the display 5 to display input characters, or drives the printer 4 to print data, or stores input character or document data in the RAM 6 as needed. The CPU 1 detects the presence/absence of the dictionary ROM 8, and enables/disables the spell checker function in accordance with the detection result. When the CPU 1 enables the spell checker function, it detects errors of word data input from the keyboard 3, or word data in a prestored document. When an error is detected, the CPU 1 informs the detected error to the operator by means of the display 5 or a buzzer (not shown).

The control operations of the CPU 1 will be described in detail below with reference to FIGS. 4 to 6.

Figure 4:
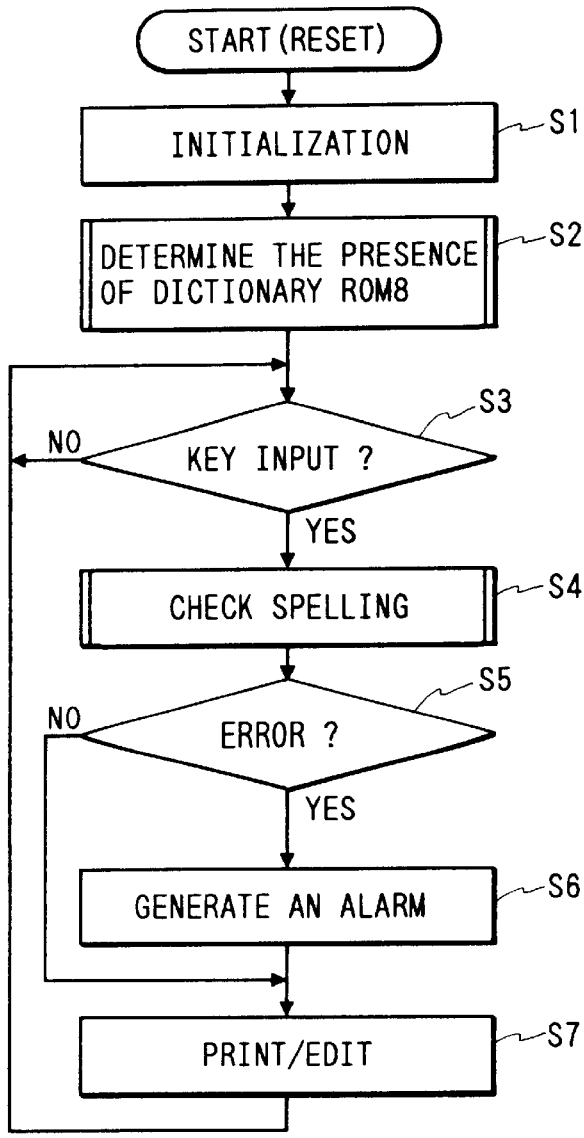
FIG. 4 is a flow chart showing the main control processing sequence of a CPU 1 shown in FIG. 1.

FIG. 4 shows the main routine of the control operation of the CPU 1. This routine is started in response to a reset signal upon power-on of the typewriter.

In step S1 in FIG. 4, the respective sections of the typewriter, e.g., the keyboard 3, the printer 4, the display 5, and the like are initialized.

In step S2, the presence/absence of the dictionary ROM 8, i.e., whether or not the dictionary ROM 8 is arranged in this typewriter is checked by the processing shown in FIG. 5 (to be described later). The detection result data is set in the register 6a as setup data indicating an enabled/disabled state of the spell checker function.

In step S3, a character input from the keyboard 3 are monitored. If the character input is detected, spell checker processing in FIG. 6 (to be described later) is executed in step S4. In step S5, the error detection result of the spell checker processing is checked. If the input data is correct, the flow advances to step S7; otherwise, the buzzer (not shown) is operated, or a display state of an error word displayed on the display 5 is reversed in step S6, thus informing the operator of the error.

The flow then advances to step S7, and the input characters are printed in accordance with the key inputs in step S3, or a document stored in the RAM 6 is edited. The flow returns to step S3, and processing from step S3 is repeated.

The presence/absence detection processing shown in FIG. 5 executed in step S2 will be explained below.

Figure 5:
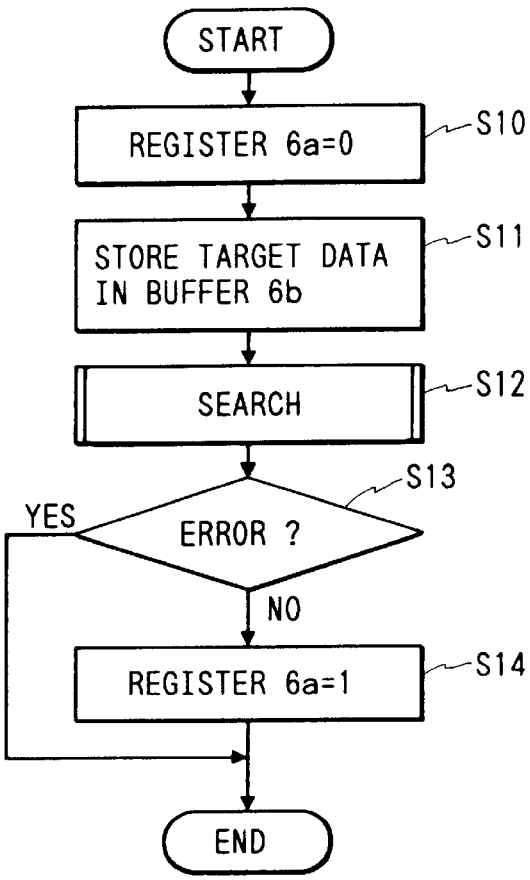
FIGS. 5 and 6 are flow charts respectively showing presence/absence detection processing and spell checker processing in FIG. 4.

In the processing shown in FIG. 5, in step S10, "0" is temporarily set as data in the register 6a. The data "0" corresponds to a detection result indicating that no dictionary ROM 8 is arranged, and indicating that the spell checker function is disabled.

In step S11, the target data 7c in the ROM 7 described above with reference to FIG. 3 is transferred to the buffer 6b of the RAM 6.

In step S12, search processing (steps S23 to S26) in the spell checker processing shown in FIG. 6 (to be described later) is executed to check if the target data "this" in the buffer 6b is present as data in the dictionary ROM 8. The search processing result is set in a status register (not shown) in the CPU 1 or the RAM 6 as normal status (presence of corresponding data) or error status (absence of corresponding data).

In step S13, it is checked if the detection result of the search processing corresponds to the error status. If the error status is detected, the processing is ended. More specifically, in this case, if data "this" is not present as data in the dictionary ROM 8, this means that no dictionary ROM 8 is present. Therefore, the data "0" in the register 6a, which data indicates the absence of the dictionary ROM 8, and the disabled spell checker function is left unchanged, and the processing is ended.

On the other hand, if the search processing result does not correspond to the error status in step S13, since the dictionary ROM 8 is present, data "1" indicating that the dictionary ROM 8 is present, and the spell checker function is enabled is set as the data in the register 6a in step S14. The processing is then ended.

The spell checker processing will be described below with reference to FIG. 6.

Figure 6:
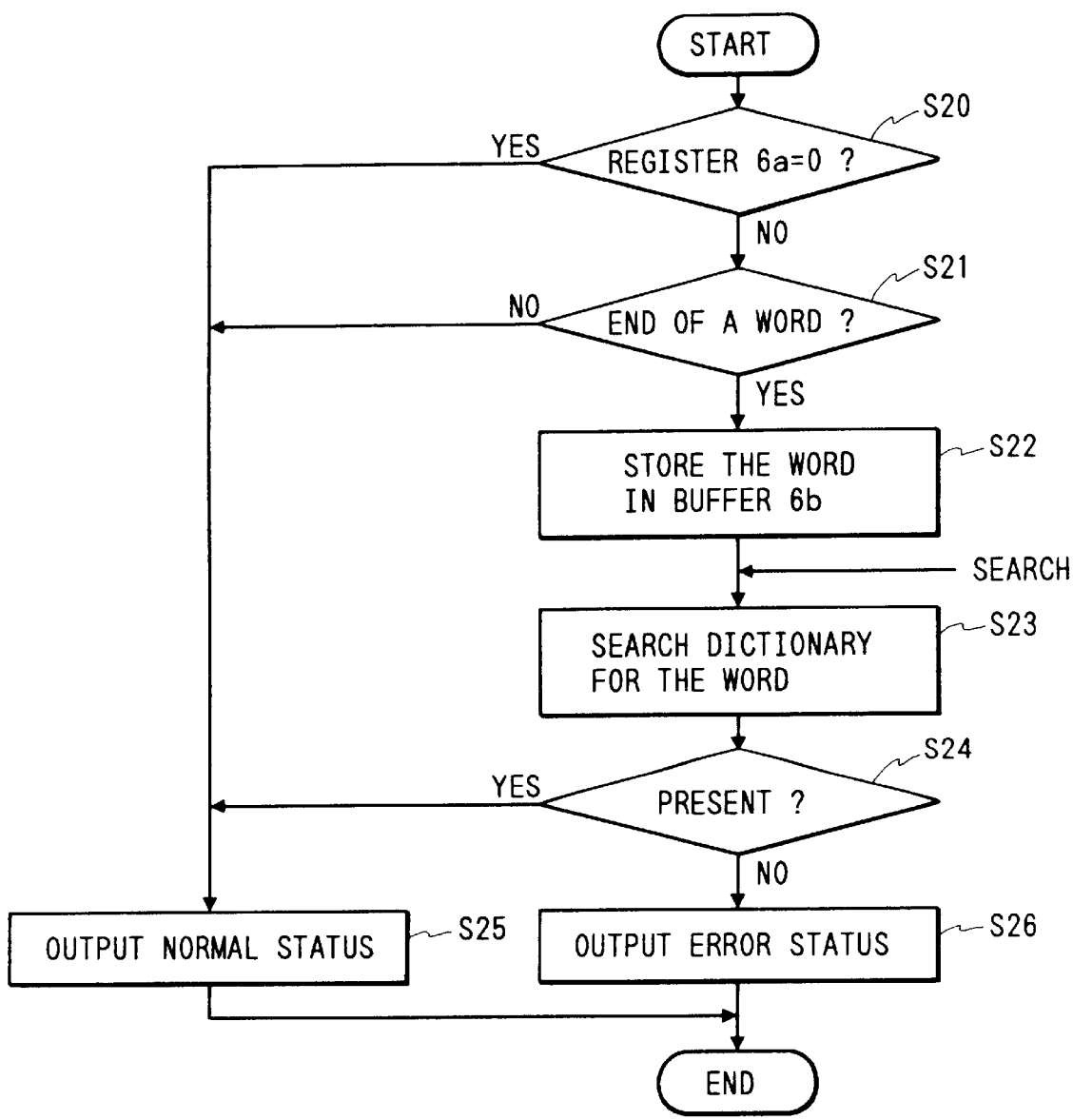

In the spell checker processing in FIG. 6, the data in the register 6a which data is set in the presence/absence detection processing in FIG. 5 is referred to in step S20 to check the enabled/disabled state of the spell checker function. If the data in the register 6a is "0", since the spell checker function is disabled, the flow advances to step S25, and the above-mentioned normal status is output so as not to execute the alarm processing in step S6 in FIG. 4, thus ending the processing.

On the other hand, if the data in the register 6a is "1" in step S20, i.e., if the spell checker function is enabled, the flow advances to step S21 to check if an input corresponds to an end or pause of a word, e.g., to check if the input corresponds to a space. If the input is a character input other than a space, and is not an end of a word, since no spell check processing is executed, the processing is ended via step S25 described above.

If the input corresponds to an end of a word in step S21, a series of characters before the end of the word is recognized as a word, and the flow advances to step S22. In step S22, the recognized word data is set in the buffer 6b, and thereafter, the search processing corresponding to step S12 in FIG. 5 described above is executed in steps S23 to S26.

In step S23, the word data set in the buffer 6b is converted into a hash code, thereby searching to determine if the data is present in the dictionary ROM 8. In this embodiment, two bytes of the dictionary ROM 8 correspond to one hash code. For example, if there is no corresponding data in the dictionary ROM 8, a hash code FFFF(HEX) appears. If the data in the buffer 6b in step S23 is "this", its hash code is not FFFF(HEX).

In step S24, the search result in step S23 is checked. If the word data in the buffer 6b is present in the dictionary ROM 8, the normal status is output in step S25 so as not to execute the alarm processing in step S6, thus ending the processing. If the word data is not present in the dictionary ROM 8, the error status is output to execute the alarm processing in step S6, thus ending the processing.

As described above, according to the electronic typewriter of this embodiment, the presence/absence of the dictionary ROM 8 is detected by searching the target data "this", and the spell checker function is enabled/disabled in accordance with the detection result. More specifically, the spell checker function is automatically enabled/disabled depending on whether or not the English dictionary ROM 8 is arranged. Regardless of whether the spell checker function is enabled or disabled, the common software program of only one kind is stored in the ROM 7. Thus, different ROMs depending on shipping countries need not be prepared like in the prior art wherein the spell checker function is enabled/disabled depending on differences in software programs. In addition, the numbers of parts and assembling steps are not increased unlike in the prior art wherein the above-mentioned setting operation is performed by a setup switch or a jumper wire. As a result, the manufacturing cost can be reduced.

Second Embodiment

In the arrangement of the first embodiment, the dictionary ROM 8 may be arranged as a so-called ROM card, and may be detachable from an electronic typewriter as an optional component. In this case, in the first embodiment, the presence/absence detection processing shown in FIG. 5 for enabling/disabling the spell checker function is performed in accordance with a reset signal upon power-on of the electronic typewriter. Therefore, an operator must turn on/off or reset the typewriter every time he or she inserts or removes a ROM card.

In order to eliminate the above drawback, the insertion/removal operation of the dictionary ROM card can be detected, and the presence/absence detection processing shown in FIG. 5 can be performed immediately after completion of the insertion/removal operation. The electronic typewriter with this arrangement will be described below as the second embodiment with reference to FIGS. 7 to 10.

Figure 7:
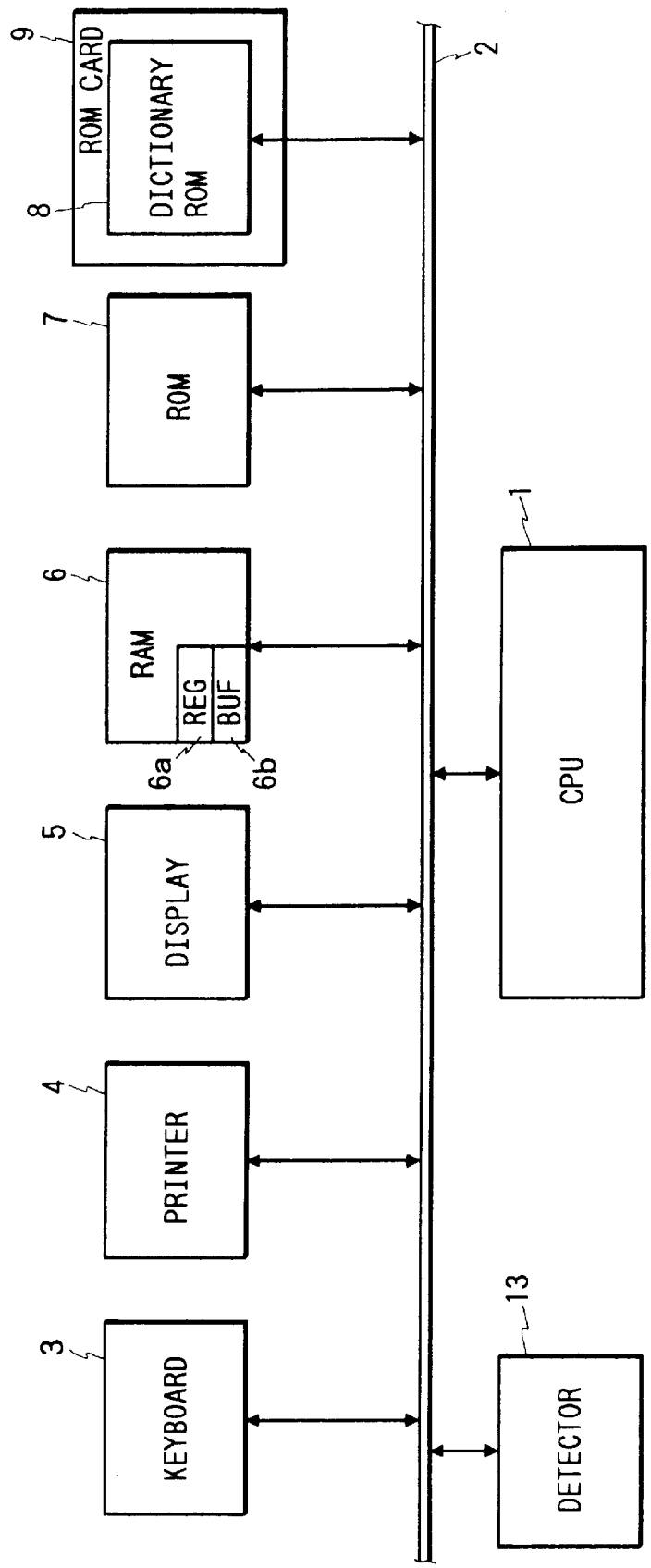
FIG. 7 is a block diagram showing an arrangement of a control system of an electronic typewriter according to the second embodiment of the present invention.
Figure 8:
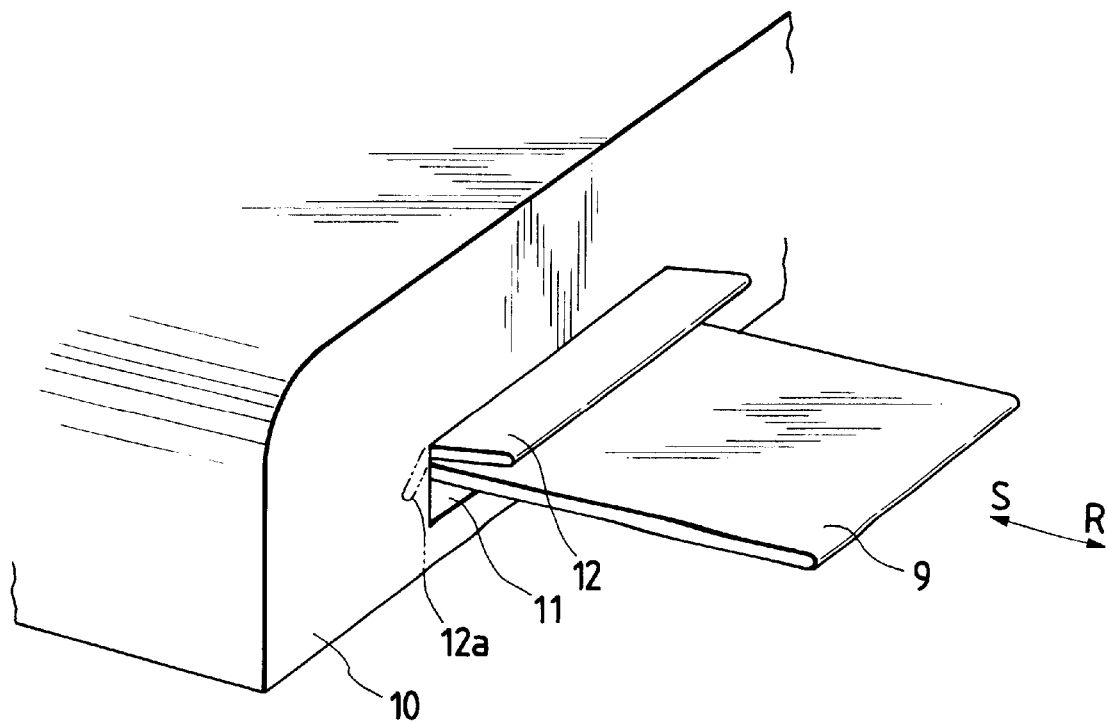
FIG. 8 is a perspective view of a portion near a card insertion port, for receiving a ROM card, of the typewriter shown in FIG. 7.

FIG. 7 shows the arrangement of a control system of the electronic typewriter according to this embodiment. In FIG. 7, common reference numerals denote common or corresponding parts in FIG. 1 in the first embodiment, and a description of the common parts will be omitted.

As a difference from FIG. 1 in the arrangement shown in FIG. 7, a dictionary ROM 8 is incorporated in a ROM card 9. The ROM card 9 is inserted from a card insertion slot 11 formed in the side portion of the exterior of an electronic typewriter main body 10 in a direction of an arrow S, and is mounted in the main body 10. In this state, the dictionary ROM 8 is connected to a CPU 1 via a bus 2. The mounted ROM card 9 can be removed in a direction of an arrow R.

Figure 9A:
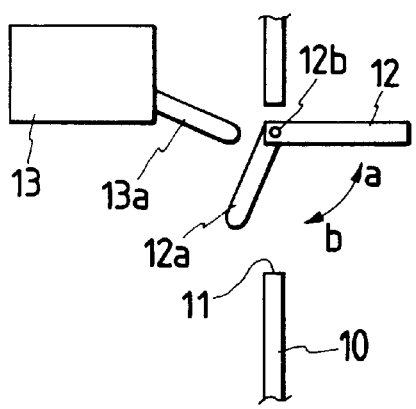
FIGS. 9A and 9B are explanatory views showing an arrangement and operation for detecting an open/closed state of a cover 12 shown in FIG. 8.
Figure 9B:
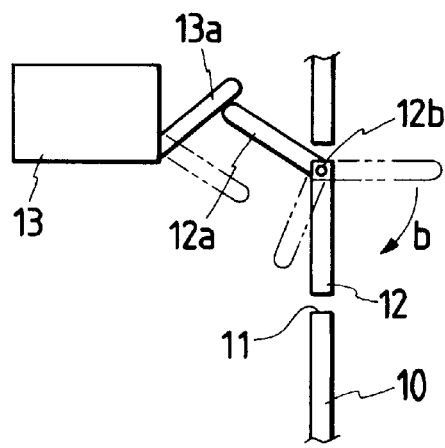

A cover 12 is arranged on the card insertion slot 11 to be pivotal in directions of arrow a and b, i.e., to be openable/closable about a shaft 12b as a fulcrum, as shown in FIGS. 9A and 9B. The insertion/removal operation of the ROM card 9 is performed by opening the cover 12 in the direction of the arrow a by an operator. When the operator releases his or her finger from the cover 12 upon completion of the insertion/removal operation, the cover 12 is pivoted in the direction of the arrow b by, e.g., a biasing force of a spring (not shown), and is closed. A projection 12a is formed on the cover 12.

As another difference from FIG. 1 in the arrangement shown in FIG. 7, a detector 13 for detecting the insertion/removal operation of the ROM card 9 is arranged. In practice, the detector 13 is arranged as a switch for detecting an open/closed state of the cover 12 near an internal portion of the card insertion slot 11, as shown in FIGS. 9A and 9B. When the cover 12 is opened, as shown in FIG. 9A, the projection 12a of the cover 12 is released from an operation lever 13a of the detector 13, thus turning off the detector 13.

When the cover 12 is closed, as shown in FIG. 9B, the projection 12a pushes the operation lever 13a to turn on the detector 13. The CPU 1 monitors an ON/OFF signal from the detector 13. When the ON/OFF signal is switched from an OFF state to an ON state, the CPU 1 detects that the cover 12 is closed, i.e., that the insertion/removal operation of the ROM card 9 is performed, and is completed.

Figure 10:
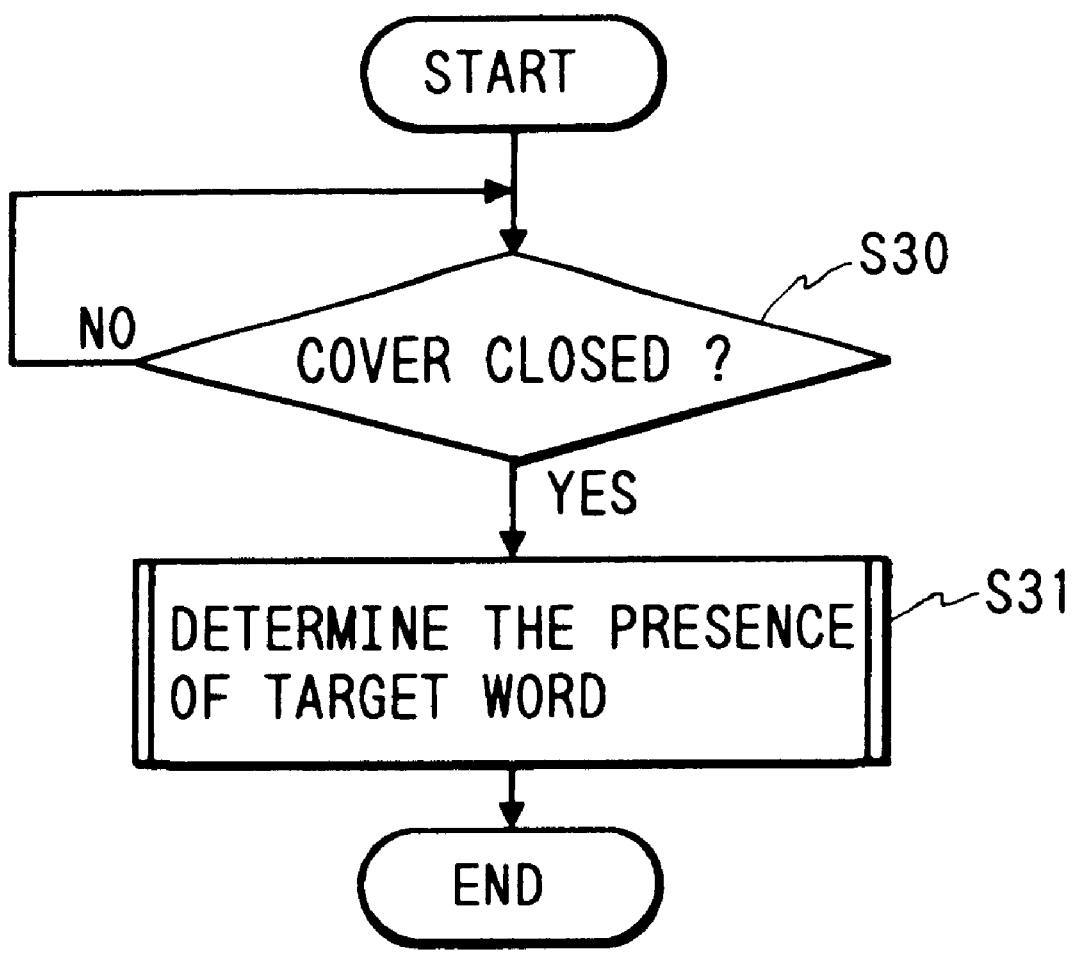
FIG. 10 is a flow chart showing presence/absence detection processing in accordance with an opening/closing operation of the cover.

In this embodiment, the insertion/removal operation of the ROM card 9 is detected, and immediately thereafter, the presence/absence detection processing in FIG. 5 described in the first embodiment is executed. FIG. 10 shows a control processing sequence of the CPU 1 for these control operations.

When the cover 12 is opened (the detector 13 is turned off), the CPU 1 starts the processing shown in FIG. 10 in response to, e.g., an interrupt signal, and waits until the cover 12 is closed (the detector 13 is turned on) in the loop of step S30. When the cover 12 is closed, the CPU 1 executes the presence/absence detection processing in step S31, and enables/disables the spell checker function in accordance with the presence/absence of the dictionary ROM 8.

The presence/absence detection processing is executed not only upon detection of the insertion/removal operation of the ROM card 9 but also in response to a reset signal upon power-on of the typewriter of this embodiment.

According to this embodiment, in the arrangement wherein the dictionary ROM 8 is detachably mounted as the ROM card 9, the spell checker function can be automatically enabled/disabled without requiring a special operation by an operator every time the ROM card 9 is inserted/removed, thus simplifying an operation on the side of the operator.

In each of the first and second embodiments, when the dictionary ROM 8 is constituted not for English but for French, and the spell checker function is automatically enabled/disabled, target data 7c in the ROM 7 is replaced with a French word, e.g., "titre", and the presence/absence of the dictionary is detected using this word. In accordance with the detection result, the spell checker function can be enabled/disabled. In other words, the target data 7c need only be set as a word in a language (language of the dictionary data in the dictionary ROM 8) as a target for the spell checker function.

In the arrangement of the above embodiment, the printer 4 is not limited to a daisy-wheel printer, but may comprise various other printers, such as a wire-dot printer, an ink-jet printer, and the like. The display 5 is not limited to an LCD, but may comprise a CRT, a plasma display, and the like.

The arrangement for enabling/disabling the spell checker function is not limited to an electronic typewriter, but may be applied to various other document processing apparatuses such as a wordprocessor, a personal computer, and the like.

As can be apparent from the above description, a document processing apparatus having a spell checker function for detecting a misspelling of an input word, and informing the misspelling, employs an arrangement comprising control means for detecting the presence/absence of a dictionary memory used for detecting the misspelling of the word, and enabling/disabling the spell checker function in accordance with the detection result. For this reason, since the spell checker function can be automatically enabled/disabled in accordance with the presence/absence of the dictionary memory, the spell checker function can be automatically enabled/disabled with an inexpensive arrangement. Therefore, the cost of the apparatus can be reduced, and an operation can be simplified.

What is claimed is:

1. An apparatus to which a dictionary memory can be connected, the dictionary memory storing a dictionary for use in performing a spell checker function, said apparatus comprising:

a program memory for storing: a main control program for controlling said apparatus; a spell checker program for performing the spell checker function on any input word comprising a control sequence for determining the presence of a dictionary memory and a spell checker processing sequence; and a specific word which the main control program will search for in the dictionary memory;

means for executing the main control program comprising:

means for determining whether the dictionary memory is connected to said apparatus by using the spell checker program comprising:

means for executing the control sequence comprising:

means for using part of the spell checker processing sequence to search for the specific word in the dictionary memory comprising means for searching for the specific word in the dictionary memory, means for outputting a normal status indication if the specific word is found in the dictionary memory, and means for outputting an error status indication if the specific word is not found in the dictionary memory;

means for determining whether an error status indication has been output by the spell checker processing sequence;

means for determining that the dictionary memory is not connected to said apparatus and for disabling the spell checker processing sequence from processing input words when said error status indication determining means determines that an error status has been output by the spell checker processing sequence;

means for determining that the dictionary memory is connected to said apparatus and for enabling the spell checker processing sequence for processing input words when said error status indication determining means determines that an error status has not been output by the spell checker processing sequence.

2. An apparatus according to claim 1, further comprising input means for inputting the input word.

3. An apparatus according to claim 1, further comprising display means for displaying the input word.

4. An apparatus according to claim 1, wherein said main control program executing means further comprises:

means for determining whether a character is input;

means for executing the spell checker processing sequence if said character determining means determines that a character has been input, the spell checker processing sequence comprising:

means for outputting a normal status indication and for preventing alarm processing to be executed when the spell checking function is disabled; and means for outputting a normal status indication if the spell checking function is enabled, the end of an input word is detected, and the input word is correctly spelled;

means for outputting an error status indication if the spell checking function is enabled, the end of an input word detected, and the input word is incorrectly spelled;

means for determining whether the spell checker processing sequence outputs an error status indication;

means for executing alarm processing to inform the user of an error in an input word when said error status indication determining means determines that the spell checker processing sequence outputs an error status indication; and means for avoiding the execution of alarm processing when said error status indication determining means determines that the spell checker processing sequence does not output an error status indication.

5. An apparatus according to claim 1, wherein said means for determining whether the dictionary memory is connected to said apparatus executes the control sequence upon turning on the power to the apparatus or resetting of said apparatus.

6. A method carried out in an apparatus to which a dictionary memory can be connected, the dictionary memory storing a dictionary for use in performing a spell checker function, the apparatus including a program memory for storing: a specific word which the main control program will search for in the dictionary memory, a main control program for controlling said apparatus, and a spell checker program for performing the spell checker function on any input word comprising a control sequence for determining the presence of a dictionary memory and a spell checker processing sequence, said method comprising the step of:

executing the main control program comprising the step of:

determining whether the dictionary memory is connected to the apparatus by using the spell checker program comprising the step of:

executing the control sequence comprising the steps of:

using part of the spell checker processing sequence to search for the specific word in the dictionary memory comprising the steps of searching for the specific word in the dictionary memory, outputting a normal status indication if the specific word is found in the dictionary memory, and outputting an error status indication if the specific word is not found in the dictionary memory;

determining whether an error status indication has been output by the spell checker processing sequence;

determining that the dictionary memory is not connected to the apparatus and disabling the spell checker processing sequence from processing input words when said error status indication determining step determines that an error status has been output by the spell checker processing sequence; and determining that the dictionary memory is connected to the apparatus and enabling the spell checker processing sequence for processing input words when said error status indication determining step determines that an error status has not been output by the spell checker processing sequence.

7. A method according to claim 6, further comprising the step of inputting the input word.

8. A method according to claim 6, further comprising the step of displaying the input word.

9. A method according to claim 6, wherein said main control program executing step further comprises the steps of:

determining whether a character is input;

executing the spell checker processing sequence if said character input determining step determines that a character has been input, the spell checker processing sequence comprising the steps of:

outputting a normal status indication and for preventing alarm processing to be executed when the spell checking function is disabled; and outputting a normal status indication if the spell checking function is enabled, the end of an input word is detected, and the input word is correctly spelled;

outputting an error status indication if the spell checking function is enabled, the end of an input word is detected, and the input word is incorrectly spelled;

determining whether the spell checker processing sequence outputs an error status indication;

executing alarm processing to inform the user of an error in an input word when said error status indication determining step determines that the spell checker processing sequence outputs an error status indication; and avoiding the execution of alarm processing when said error status indication determining step determines that the spell checker processing sequence does not output an error status indication.

10. A method according to claim 6, wherein said whether-the-dictionary-is-connected-to-the-apparatus-determining step is executed upon turning on the power of the apparatus or resetting of the apparatus.

11. A computer usable medium having computer readable program code means embodied therein for carrying out a method in a computer to which a dictionary memory can be connected, the dictionary memory storing a dictionary for use in performing a spell checker function, the computer including a program memory for storing: a specific word which the main control program will search for in the dictionary memory, a main control program for controlling said apparatus, and a spell checker program for performing the spell checker function on any input word comprising a control sequence for determining the presence of a dictionary memory and a spell checker processing sequence, said computer readable program code means comprising:

first computer readable program code means for causing the computer to execute the main control program comprising:

second computer readable program code means for causing the computer to determine whether the dictionary memory is connected to the apparatus by using the spell checker program comprising:

third computer readable program code means for causing the computer to execute the control sequence comprising:

fourth computer readable program code means for causing the computer to use part of the spell checker processing sequence to search for the specific word in the dictionary memory comprising fifth computer readable program code means for causing the computer to search for the specific word in the dictionary memory, sixth computer readable program code means for causing the computer to output a normal status indication if the specific word is found in the dictionary memory, and seventh computer readable program code means for causing the computer to output an error status indication if the specific word is not found in the dictionary memory;

eighth computer readable program code means for causing the computer to determine whether an error status indication has been output by the spell checker processing sequence;

ninth computer readable program code means for causing the computer to determine that the dictionary memory is not connected to the apparatus and to disable the spell checker processing sequence from processing input words when an error status has been output by the spell checker processing sequence; and tenth computer readable program code means for causing the computer to determine that the dictionary memory is connected to the apparatus and to enable the spell checker processing sequence for processing input words when the computer determines that an error status has not been output by the spell checker processing sequence.

12. A computer usable medium according to claim 11, further comprising fifth computer readable program code means for causing the computer to input the input word.

13. A computer usable medium according to claim 11, further comprising fifth computer readable program code means for causing the computer to display the input word.

14. A computer usable medium according to claim 11, wherein said first computer readable program code means further comprises:

eleventh computer readable program code means for causing the computer to determine whether a character is input;

twelfth computer readable program code means for causing the computer to execute the spell checker processing sequence if the computer determines that a character has been input, said twelfth computer readable program code means comprising:

thirteenth computer readable program code means for causing the computer to output a normal status indication and to prevent alarm processing to be executed when the spell checking function is disabled;

fourteenth computer readable program code means for causing the computer to output a normal status indication if the spell checking function is enabled, the end of an input word is detected, and the input word is correctly spelled;

fifteenth computer readable program code means for causing the computer to output an error status indication if the spell checking function is enabled, the end of an input word is detected, and the input word is incorrectly spelled;

sixteenth computer readable program code means for causing the computer to determine whether the spell checker processing sequence outputs an error status indication;

seventeenth computer readable program code means for causing the computer to execute alarm processing to inform the user of an error in an input word when the computer determines that the spell checker processing sequence outputs an error status indication; and eighteenth computer readable program code means for causing the computer to avoid the execution of alarm processing when the computer determines that the spell checker processing sequence does not output an error status indication.

15. A computer usable medium according to claim 11, wherein said first computer readable program code means causes the computer to execute the main control program upon turning on the power to the computer or resetting the computer.

* * * * *

UNITED STATES PATENT AND TRADEMARK OFFICE
CERTIFICATE OF CORRECTION

PATENT NO. : 5,924,059

DATED : July 13, 1999

INVENTOR(S): TETSUYA KAWANABE

It is certified that error appears in the above-identified patent and that said Letters Patent is hereby corrected as shown below:

COVER PAGE AT ITEM [30] FOREIGN APPLICATION PRIORITY DATA:
"May 13, 1990" should read --May 23, 1990--.

Signed and Sealed this

Fifteenth Day of February, 2000

Attest:

Q. TODD DICKINSON

*Attesting Officer*  *Commissioner of Patents and Trademarks*